United States Patent
Lee et al.

(10) Patent No.: US 9,258,147 B2
(45) Date of Patent: Feb. 9, 2016

(54) MULTI-FRAME DATA PROCESSING APPARATUS AND METHOD USING FRAME DISASSEMBLY

(71) Applicant: ELECTRONICS AND TELECOMMUNICATIONS RESEARCH INSTITUTE, Daejeon (KR)

(72) Inventors: Seung-Soo Lee, Daejeon (KR); Seong-Jun Shin, Daejeon (KR); Jeong-Seok Lim, Daejeon (KR); Jung-Gil Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 155 days.

(21) Appl. No.: 14/085,360

(22) Filed: Nov. 20, 2013

(65) Prior Publication Data

US 2014/0331026 A1  Nov. 6, 2014

(30) Foreign Application Priority Data

May 6, 2013  (KR) .......................  10-2013-0050400

(51) Int. Cl.
*H04L 12/64*  (2006.01)
(52) U.S. Cl.
CPC .................................. *H04L 12/6418* (2013.01)

(58) Field of Classification Search
None
See application file for complete search history.

(56) References Cited

U.S. PATENT DOCUMENTS

| 5,784,380 | A  | * | 7/1998 | Kuwahara ..................... 370/509 |
| 6,744,778 | B1 |   | 6/2004 | Allpress et al. |
| 6,931,009 | B1 | * | 8/2005 | Agarwal ..................... 370/395.1 |
| 8,717,203 | B2 | * | 5/2014 | Fallon .............................. 341/51 |
| 2003/0105896 | A1 | * | 6/2003 | Gredone et al. ............... 710/33 |
| 2005/0058126 | A1 | * | 3/2005 | Zettwoch ...................... 370/375 |
| 2008/0198792 | A1 |   | 8/2008 | Kim et al. |
| 2014/0331026 | A1 | * | 11/2014 | Lee et al. ........................ 712/26 |

FOREIGN PATENT DOCUMENTS

| KR | 10-1999-0077587 A | 10/1999 |
| KR | 10-2001-0007532 A | 1/2001 |
| KR | 10-2001-0018469 A | 3/2001 |

* cited by examiner

*Primary Examiner* — Benjamin H Elliott, IV
(74) *Attorney, Agent, or Firm* — LRK Patent Law Firm

(57) ABSTRACT

A multi-frame data processing apparatus and method using frame disassembly is provided. The multi-frame data apparatus includes a data communication unit, a frame processing unit, and a data processing unit. The data communication unit receives a transmission signal from a Line Adaptation Unit (LAU). The frame processing unit disassembles each frame of the transmission signal and acquires information data that is included in the transmission signal. The data processing unit transfers the information data to an Algorithm Processing Unit (APU), and acquires processed information data that is obtained by processing the information data via the APU based on a corresponding algorithm.

18 Claims, 4 Drawing Sheets

MULTI-FRAME DATA PROCESSING APPARATUS AND METHOD USING FRAME DISASSEMBLY

CROSS-REFERENCE TO RELATED APPLICATION

This application claims the benefit of Korean Patent Application No. 10-2013-0050400, filed on May 6, 2013, which is hereby incorporated by reference in its entirety into this application.

BACKGROUND OF THE INVENTION

1. Technical Field

The present invention relates generally to a multi-frame data processing apparatus and method using frame disassembly and, more particularly, to a multi-frame data processing apparatus and method using frame disassembly, which are capable of processing data of transmission signals having multiple frames.

2. Description of the Related Art

In general, technologies are designed to receive transmission signals having a single frame structure and then process the data of the transmission signals.

In common algorithm processing and encryption processing systems, a technique for processing the data of transmission signals having various frame structures using a single apparatus is an important factor.

Korean Patent Application Publication No. 2001-0018469 relates to a byte-based data processing apparatus for an optical transmission system, and discloses a technology in which, in order to prevent a data slip and to process data at high speed, input bit-based data and a clock are converted into byte-based data, stuffing management is performed on the byte-based data, and the resulting data and clock are output in a desired format.

In this conventional data processing technology, only switching from bit-based data processing to byte-based data processing has been taken into consideration in an optical transmission system, but specific techniques related to factors that need to be taken into consideration in order to process the data of transmission signals having multiple frames and related to how the data of the transmission signals having multiple frames will be processed while the factors are being taken into consideration have not been proposed.

Accordingly, there is an urgent need for a new data processing technology, which disassembles transmission signals having a multi-frame structure into format data and information data, processes only the information data based on an algorithm via an Algorithm Processing Unit (APU), reassembles the processed information data using the format data, converts a transmission signal having a Pulse Code Modulation (PCM) frame structure into parallel data, and processes the parallel data based on an algorithm, thereby enabling more rapid and efficient multi-frame data processing.

SUMMARY OF THE INVENTION

Accordingly, the present invention has been made keeping in mind the above problems occurring in the prior art, and an object of the present invention is to provide a multi-frame data processing apparatus and method using frame disassembly, which process transmission signals having a multi-frame structure based on an algorithm using a single apparatus, thereby enabling more convenient multi-frame data processing that does not require a separate apparatus for each frame structure.

Another object of the present invention is to provide a multi-frame data processing apparatus and method using frame disassembly, which disassemble transmission signals having a multi-frame structure into format data and information data, process only the information data based on an algorithm using an APU, and reassemble the processed information data using the format data, thereby enabling more efficient multi-frame data processing.

Yet another object of the present invention is to provide a multi-frame data processing apparatus and method using frame disassembly, which convert a transmission signal having a PCM frame structure into parallel data and process the parallel data based on an algorithm, thereby enabling more rapid multi-frame data processing.

In accordance with an aspect of the present invention, there is provided a multi-frame data processing apparatus using frame disassembly, the apparatus including a data communication unit configured to receive a transmission signal from a Line Adaptation Unit (LAU); a frame processing unit configured to disassemble each frame of the transmission signal and acquire information data that is included in the transmission signal; and a data processing unit configured to transfer the information data to an Algorithm Processing Unit (APU) and acquire processed information data that is obtained by processing the information data via the APU based on a corresponding algorithm.

The frame processing unit may include a frame structure acquisition unit configured to acquire a frame structure of the transmission signal; a frame disassembly unit configured to acquire format data and the information data that are included in the transmission signal in accordance with the frame structure; and a frame storage unit configured to store the frame structure and the format data.

The frame processing unit further comprises a frame reassembly unit configured to reassemble the format data and the processed information data into a processed transmission signal corresponding to the frame structure; and the data communication unit may send the processed transmission signal to the LAU.

The frame processing unit may further include a serial/parallel data conversion unit configured to convert serial data and parallel data into each other in accordance with the frame structure.

The serial/parallel data conversion unit may convert the transmission signal, that is, serial data, into parallel data and the processed information data, that is, parallel data, into serial data if the frame structure is a Pulse Code Modulation (PCM) frame structure.

The serial/parallel data conversion unit may divide the transmission signal, that is, serial data, by the duration of a time slot, and may then convert the serial data into parallel data.

The format data may include signaling bits if the frame structure is the PCM frame structure.

The format data may include one or more of header information and footer information if the frame structure is an Ethernet frame structure.

The information data may include information bits if the frame structure is the PCM frame structure.

The information data may include payload information if the frame structure is an Ethernet frame structure.

In accordance with another aspect of the present invention, there is provided a multi-frame data processing method using frame disassembly, the method including receiving a transmission signal from an LAU; disassembling each frame of the transmission signal and acquiring information data included in the transmission signal; and transferring the information data to an Algorithm Processing Unit (APU) and then acquiring processed information data that is obtained by processing the information data via the APU based on a corresponding algorithm.

Acquiring the information data may include acquiring a frame structure of the transmission signal; acquiring format data and the information data that are included in the transmission signal in accordance with the frame structure; and storing the frame structure and the format data.

The multi-frame data processing method may further include reassembling the format data and the processed information data into a processed transmission signal corresponding to the frame structure; and, sending the processed transmission signal to the LAU.

Acquiring the information data may further include converting serial data and parallel data into each other in accordance with the frame structure.

Converting serial, data and parallel data to each other may include converting the transmission signal, that is, serial data, into parallel data and the processed information data, that is, parallel data, into serial data if the frame structure is a PCM frame structure.

Converting serial data and parallel data to each other may include dividing the transmission signal, that is, serial data, by the duration of a time slot and then converting the serial data into parallel data.

The format data may include signaling bits if the frame structure is the PCM frame structure.

The format data may include one or more of header information and footer information if the frame structure is an Ethernet frame structure.

The information data may include information bits if the frame structure is the PCM frame structure.

The information data may include payload information if the frame structure is an Ethernet frame structure.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
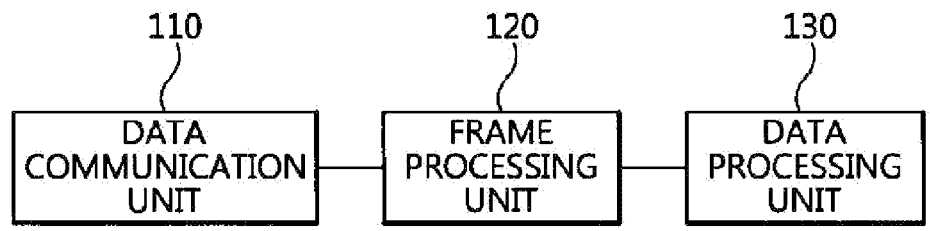
FIG. 1 is a block diagram of a multi-frame data processing apparatus using frame disassembly according to an embodiment of the present invention.

The present invention will be described in detail below with reference to the accompanying drawings. Repeated descriptions and descriptions of known functions and configurations which have been deemed to make the gist of the present invention unnecessarily vague will be omitted below.

The embodiments of the present invention are intended to fully describe the present invention to a person having ordinary knowledge in the art. Accordingly, the shapes, sizes, etc. of elements in the drawings may be exaggerated to make the description clear.

FIG. 1 is a block diagram of a multi-frame data processing apparatus using frame disassembly according to an embodiment of the present invention.

Referring to FIG. 1, the multi-frame data processing apparatus using frame disassembly according to this embodiment of the present invention includes a data communication unit 110, a frame processing unit 120, and a data processing unit 130.

The data communication unit 110 receives a transmission signal from a Line Adaptation Unit (LAU).

The data communication unit 110 may send a processed transmission signal to the LAU.

The frame processing unit 120 disassembles each frame of the transmission signal, and acquires information data that is included in the transmission signal.

The frame processing unit 120 may include a frame structure acquisition unit 210, a frame disassembly unit 220, and a frame storage unit 230.

The frame structure acquisition unit 210 may acquire the frame structure of the transmission signal.

For example, the frame structure may be any one of a PCM frame structure and an Ethernet frame structure.

For example, the PCM frame structure may include a T1 frame structure, an E1 frame structure, a DS3 frame structure, and a V.35 frame structure.

The frame disassembly unit 220 may acquire format data and the information data that are included in the transmission signal in accordance with the frame structure.

The frame storage unit 230 may store the frame structure and the format data.

The frame processing unit 120 may further include a frame reassembly unit 240 that reassembles the format data and the processed information data into a processed transmission signal corresponding to the frame structure.

The frame processing unit 120 may further include a serial/parallel data conversion unit that converts serial data and parallel data into each other in accordance with the frame structure.

If the frame structure is a PCM frame structure, the serial/parallel data conversion unit may convert the transmission signal, that is, serial data, into parallel data and convert the processed information data, that is, parallel data, into serial data.

In this case, the serial/parallel data conversion unit may divide the transmission signal, that is, serial data, by the duration of a unit time slot and then convert the serial data into parallel data.

For example, the serial/parallel data conversion unit may divide the transmission signal, that is, serial data, by one byte corresponding to the duration of a unit time slot and then convert the serial data into parallel data.

In this case, the serial/parallel data conversion unit may divide the transmission signal, that is, serial data, by the duration of each Asynchronous Transfer Mode (ATM) cell and then convert the serial data into the parallel data.

For example, the serial/parallel data conversion unit may divide the transmission signal, that is, serial data, by 53 bytes corresponding to the duration of a unit ATM cell and then convert the serial data into the parallel data.

In this case, the frame reassembly unit 240 may convert the processed information data, that is, the parallel data that has been obtained through the division by the duration of the time slot and the conversion, into serial data again.

For example, the frame reassembly unit 240 may convert the processed information data, that is, the parallel data that has been obtained through the division by one byte corresponding to the duration of a unit time slot and the conversion, into serial data again.

In this case, the frame reassembly unit 240 may convert the processed information data, that is, the parallel data that has been obtained through the division by the duration of the ATM cell and the conversion, into serial data again.

For example, the frame reassembly unit 240 may convert the processed information data, that is, the parallel data that has been obtained through the division by 53 bytes corresponding to the duration of a unit ATM cell and the conversion, into serial data again.

The data processing unit 130 transfers the information data to an Algorithm Processing Unit (APU), and acquires processed information data that is obtained by processing the information data via the APU based on a corresponding algorithm.

As described above, in the multi-frame data processing apparatus using frame disassembly according to this embodiment of the present invention, the data communication unit 110 receives a transmission signal from the LAU. The frame processing unit 120 disassembles the frame of the transmission signal depending on whether the frame structure of the transmission signal is a PCM frame structure or an Ethernet frame structure, and acquires information data included in the transmission signal. The data processing unit 130 transfers the information data to the APU, and acquires processed information data that is obtained by processing the information data via the APU based on a corresponding algorithm. Accordingly, it can be seen that transmission signals having a multi-frame structure can be processed based on an algorithm using a single apparatus.

Figure 2:
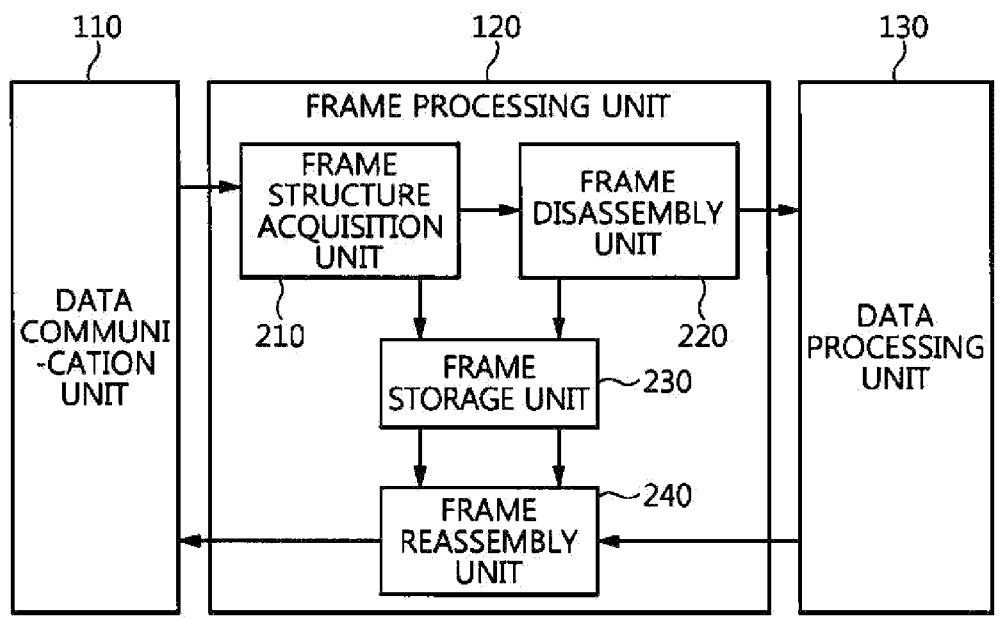
FIG. 2 is a block diagram illustrating an example of the frame processing unit illustrated in FIG. 1.

FIG. 2 is a block diagram illustrating an example of the frame processing unit 120 illustrated in FIG. 1.

Referring to FIG. 2, the frame processing unit 120 of FIG. 1 includes the frame structure acquisition unit 210, the frame disassembly unit 220, the frame storage unit 230, and the frame reassembly unit 240.

The frame structure acquisition unit 210 acquires the frame structure of a transmission signal.

For example, the frame structure may be any one of a PCM frame structure and an Ethernet frame structure.

For example, the PCM frame structure may include a T1 frame structure, an E1 frame structure, a DS3 frame structure, and a V.35 frame structure.

The frame disassembly unit 220 acquires format data and information data that are included in the transmission signal in accordance with the frame structure.

If the frame structure is a PCM frame structure, the format data may include signaling bits.

For example, if the frame structure is a T1 frame structure, that is, a PCM frame structure, the format data may include signaling bits "100011011100" that are inserted into a frame.

For example, if the frame structure is an E1 frame structure, that is, a PCM frame structure, the format data may include signaling bits that are included in the channels 0 and 16 of a corresponding frame.

If the frame structure is an Ethernet frame structure, the format data may include one or more of header information and footer information.

For example, if the frame structure is an Ethernet frame structure, the format data may include Preamble, SFD, DA, SA, Type/Length, and FCS information, that is, the header information.

In this case, if the frame structure is a PCM frame structure, the information data may include information bits.

For example, if the frame structure is a T1 frame structure that is a PCM frame structure, the information data may include information bits that are included in channels 1 to 24 within the corresponding frame.

For example, if the frame structure is an E1 frame structure that is a PCM frame structure, the format data may include information bits that are included in channels 1 to 15 and channels 17 to 31 within the corresponding frame.

If the frame structure is an Ethernet frame structure, the information data may include may include payload information.

The frame storage unit 230 stores the frame structure and the format data.

The frame reassembly unit 240 reassembles the format data and the processed information data into a processed transmission signal corresponding to the frame structure.

In this case, the frame reassembly unit 240 may convert the processed information data, that is, parallel data that has been obtained through the division by the duration of the time slot and the conversion, into serial data again.

For example, the frame reassembly unit 240 may convert the processed information data, that is, parallel data that has been obtained through the division by one byte corresponding to the duration of a unit time slot and the conversion, into serial data again.

In this case, the frame reassembly unit 240 may convert the processed information data, that is, parallel data that has been obtained through the division by the ATM cell and the conversion, into serial data again.

For example, the frame reassembly unit 240 may convert the processed information data, that is, parallel data that has been obtained through the division by 53 bytes corresponding to the duration of a unit ATM cell and the conversion, into serial data again.

Although not illustrated in FIG. 2, the frame processing unit 120 of FIG. 1 may further include the serial/parallel data conversion unit that converts serial data and parallel data to each other in accordance with the frame structure.

If the frame structure is a PCM frame structure, the serial/parallel data conversion unit may convert the transmission signal, that is, serial data, into parallel data and convert the processed information data, that is, parallel data into serial data.

In this case, the serial/parallel data conversion unit may divide the transmission signal, that is, serial data, by the duration of the time slot, and convert the serial data into parallel data.

For example, the serial/parallel data conversion unit may divide the transmission signal, that is, serial data, by one byte corresponding to the duration of a unit time slot and then convert the serial data into parallel data.

In this case, the serial/parallel data conversion unit may divide the transmission signal, that is, serial data, by the duration of a unit ATM cell and then convert the serial data into the parallel data.

For example, the serial/parallel data conversion unit may divide the transmission signal, that is, serial data, by 53 bytes corresponding to the duration of a unit ATM cell and then convert the serial data into the parallel data.

Figure 3:
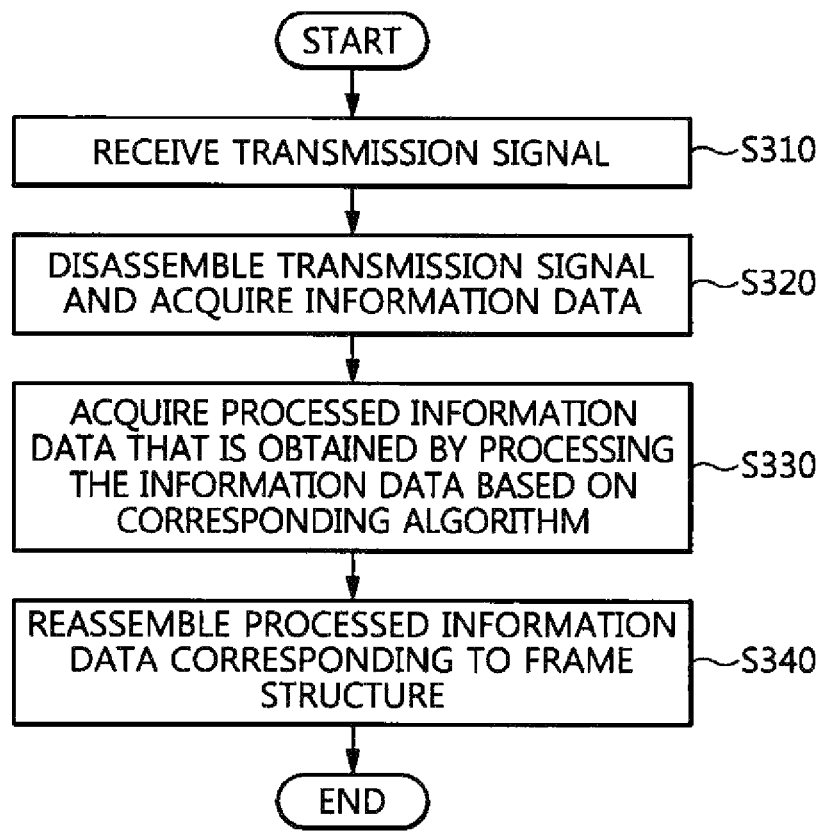
FIG. 3 is a flowchart illustrating a multi-frame data processing method using frame disassembly according to an embodiment of the present invention.

FIG. 3 is a flowchart illustrating a multi-frame data processing method using frame disassembly according to, an embodiment of the present invention.

Referring to FIG. 3, in the multi-frame data processing method using frame disassembly according to the present invention, first, a transmission signal is received from the LAU at step S310.

At step S310, a processed transmission signal may be transmitted to the LAU.

Each frame of the transmission signal is disassembled and information data included in the transmission signal is acquired at step S320.

At step S320, the frame structure of the transmission signal may be further acquired.

For example, the frame structure may be any one of a PCM frame structure and an Ethernet frame structure.

For example, the PCM frame structure may include a T1 frame structure, an E1 frame structure, a DS3 frame structure, and a V.35 frame structure.

At step S320, format data and the information data that are included in the transmission signal may be further acquired in accordance with the frame structure.

If the frame structure is a PCM frame structure, the format data may include signaling bits.

For example, if the frame structure is a T1 frame structure that is a PCM frame structure, the format data may include signaling bits "100011011100" that are inserted into the frame.

For example, if the frame structure is an E1 frame structure that is a PCM frame structure, the format data may include signaling bits that are included in channels 0 and 16 within the corresponding frame.

If the frame structure is an Ethernet frame structure, the format data may include one or more of header information and footer information.

For example, if the frame structure is an Ethernet frame structure, the format data may include Preamble, SFD, DA, SA, Type/Length, and FCS information, that is, the header information.

In this case, if the frame structure is a PCM frame structure, the information data may include information bits.

For example, if the frame structure is a T1 frame structure that is a PCM frame structure, the information data may include information bits that are included in channels 1 to 24 within the corresponding frame.

For example, if the frame structure is an E1 frame structure that is a PCM frame structure, the format data may include information bits that are included in channels 1 to 15 and channels 17 to 31 within the corresponding frame.

If the frame structure is an Ethernet frame structure, the information data may include may include payload information.

At step S320, the frame structure and the format data may be further stored.

The format data and the frame structure stored at step S320 may be used to reassemble a processed transmission signal.

Step S320 may further include the step of converting serial data and parallel data into each other in accordance with the frame structure.

In this case, the step of converting serial data and parallel data to each other may include the step of converting the transmission signal, that is, serial data, into parallel data and converting the processed information data, that is, parallel data, into serial data, if the frame structure is a PCM frame structure.

In this case, the step of converting serial data and parallel data to each other may include the step of dividing the transmission signal, that is, serial data, by the duration of a time slot and then converting the serial data into parallel data.

For example, the step of converting serial data and parallel data to each other may include the step of dividing the transmission signal, that is, serial data, by one byte corresponding to the duration of a unit time slot and then converting the serial data into parallel data.

In this case, the step of converting serial data and parallel data to each other may include the step of dividing the transmission signal, that is, serial data, by the duration of an ATM cell and then converting the serial data into the parallel data.

For example, the step of converting serial data and parallel data to each other may include the step of dividing the transmission signal, that is, serial data, by 53 bytes corresponding to the duration of a unit ATM cell and then converting the serial data into the parallel data.

Furthermore, the information data is transferred to the APU and then processed information that is obtained by processing the information data via the APU based on a corresponding algorithm is acquired at step S330.

The format data and the processed information data are reassembled into a processed transmission signal corresponding to the frame structure at step S340.

In this case, the processed information data, that is, parallel data that has been obtained through the division by the duration of a time slot and the conversion, may be converted into serial data again.

For example, the step of reassembling the format data and the processed information data into a processed transmission signal corresponding to the frame structure may include the step of converting the processed information data, that is, parallel data that has been obtained through the division by one byte corresponding to the duration of a unit time slot and the conversion, into serial data again.

In this case, the step of reassembling the format data and the processed information data into a processed transmission signal corresponding to the frame structure may include the step of converting the processed information data, that is, parallel data that has been obtained by the division by the duration of a unit ATM cell and the conversion, into serial data again.

For example, the step of reassembling the format data and the processed information data into a processed transmission signal corresponding to the frame structure may include the step of converting the processed information data, that is, parallel data that has been obtained through the division by 53 bytes corresponding to the duration of a unit ATM cell and the conversion, into serial data again.

Figure 4:
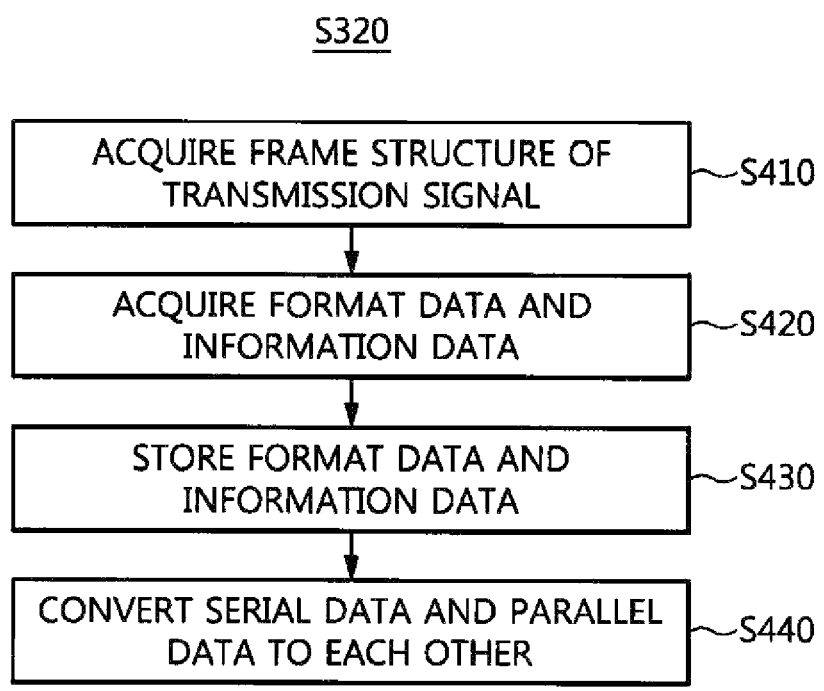
FIG. 4 is a flowchart illustrating an example of the step of acquiring information data in the method of FIG. 3.

FIG. 4 is a flowchart illustrating an example of step S320 of acquiring information data in the method of FIG. 3.

Referring to FIG. 4, step S320 of acquiring information data in the method of FIG. 3 includes step S410 of acquiring the frame structure of the transmission signal.

For example, the frame structure may be any one of a PCM frame structure and an Ethernet frame structure.

For example, the PCM frame structure may include a T1 frame structure, an E1 frame structure, a DS3 frame structure, and a V.35 frame structure.

Furthermore, step S320 of acquiring information data in the method of FIG. 3 includes the step of acquiring format data and information data that are included in the transmission signal in accordance with the frame structure at step S420.

If the frame structure is a PCM frame structure, the format data may include signaling bits.

For example, if the frame structure is a T1 frame structure that is a PCM frame structure, the format data may include signaling bits "100011011100" that are inserted into the corresponding frame.

For example, if the frame structure is an E1 frame structure that is a PCM frame structure, the format data may include signaling bits that are included in channels 0 and 16 within the corresponding frame.

If the frame structure is an Ethernet frame structure, the format data may include one or more of header information and footer information.

For example, if the frame structure is an Ethernet frame structure, the format data may include Preamble, SFD, DA, SA, Type/Length, and FCS information, that is, the header information.

In this case, if the frame structure is a PCM frame structure, the information data may include information bits.

For example, if the frame structure is a T1 frame structure that is a PCM frame structure, the information data may include information bits that are included in channels 1 to 24 within the corresponding frame.

For example, if the frame structure is an E1 frame structure that is a PCM frame structure, the format data may include information bits that are included in channel 1 to channels 15 and channels 17 to 31 within the corresponding frame.

If the frame structure is an Ethernet frame structure, the information data may include payload information.

Furthermore, step S320 of acquiring information data in the method of FIG. 3 includes step S430 of storing, the frame structure and the format data.

The format data and the frame structure stored at step S430 may be used to reassemble a processed transmission signal.

Furthermore, step S320 of acquiring information data in the method of FIG. 3 includes step S440 of converting serial data and parallel data to each other in accordance with the frame structure.

At step S440, if the frame structure is a PCM frame structure, the transmission signal that is serial data may be converted into parallel data, and the processed information data that is parallel data may be converted into serial data.

At step S440, the transmission signal that is serial data may be divided by the duration of the time slot and then converted into parallel data.

For example, at step S440, the transmission signal that is serial data may be divided by one byte corresponding to the duration of a unit time slot and then converted into parallel data.

At step S440, the transmission signal that is serial data may be divided by the duration of a unit ATM cell and then converted into parallel data.

For example, at step S440, the transmission signal that is serial data may be divided by 53 bytes corresponding to the duration of a unit ATM cell and then converted into parallel data.

Figure 5:
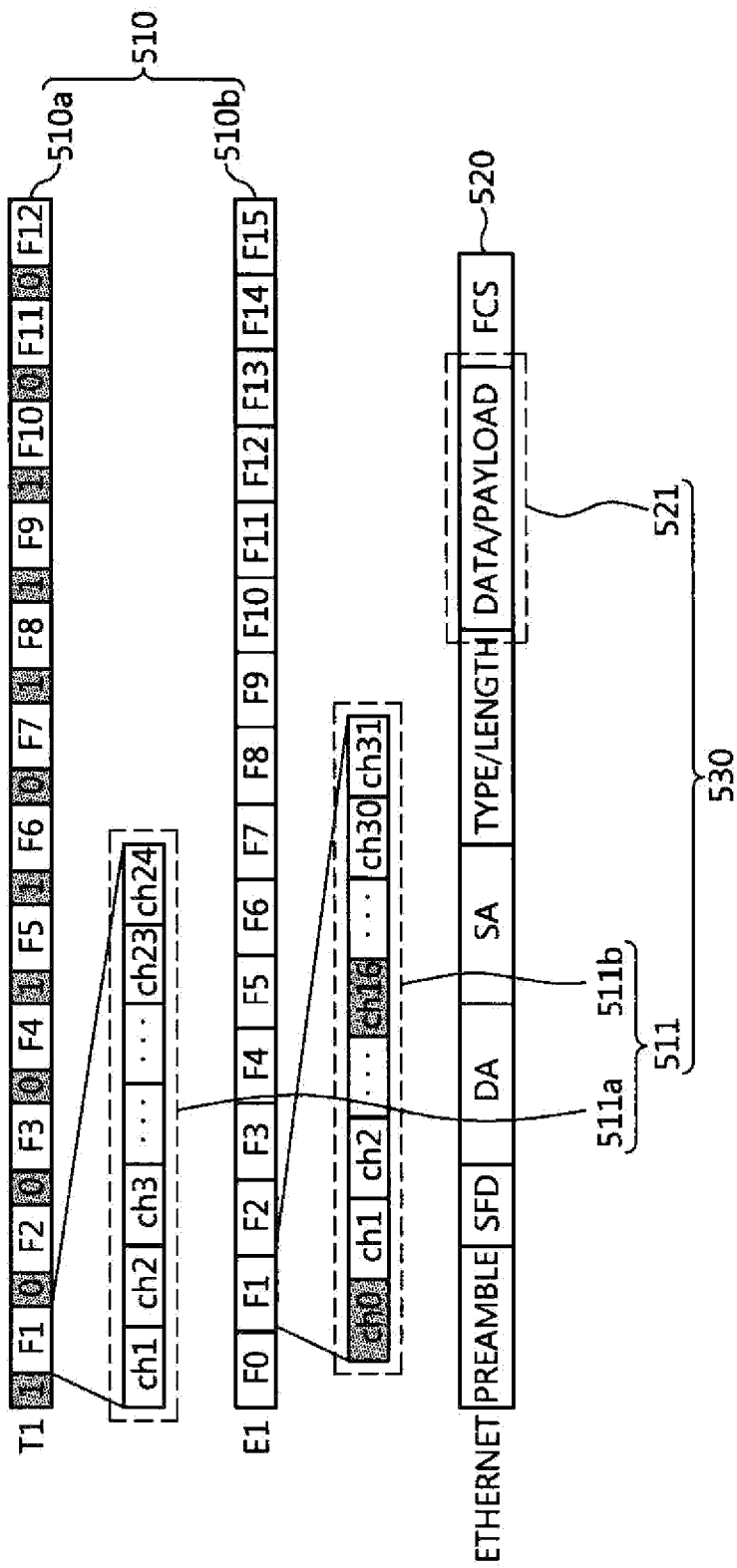
FIG. 5 is a diagram illustrating examples of a transmission signal and information data according to an embodiment of the present invention.

FIG. 5 is a diagram illustrating examples of a transmission signal and information data according to an embodiment of the present invention.

From FIG. 5, it can be seen that the frame structure of a transmission signal according to this embodiment of the present invention includes one or more of a T1 frame structure 510a, an E1 frame structure 510b, and an Ethernet frame structure 520.

It can be seen that the transmission signal according to this embodiment of the present invention includes format data (the shaded portions in FIG. 5) and information data 530.

If the frame structure is the PCM structure 510, the format data may include signaling bits.

For example, if the frame structure is the T1 frame structure 510a, the format data may include signaling bits "100011011100" that are inserted into a corresponding frame.

For example, if the frame structure is the E1 frame structure 510b, the format data may include signaling bits that are included in channels 0 and 16 within the corresponding frame.

In this case, if the frame structure is the Ethernet frame structure 520, the format data may include one or more of header information and footer information.

For example, if the frame structure is the Ethernet frame structure 520, the format data may include Preamble, SFD, DA, SA, Type/Length, and FCS information that belong to the header information.

If the frame structure is the PCM frame structure 510, the information data 530 may include information bits 511.

For example, if the frame structure is the T1 frame structure 510a, the information data 530 may include information bits that are included in channels 1 to 24 within a corresponding frame (511a).

For example, if the frame structure is the E1 frame structure 510b, the format data may include information bits that are included in channels 1 to 15 and channels 17 to 31 within a corresponding frame (511b).

If the frame structure is the Ethernet frame structure 520, the information data 530 may include payload (521) information.

As described above, in accordance with an embodiment of the present invention, there are provided a multi-frame data processing apparatus and method using frame disassembly, which process transmission signals having a multi-frame structure based on an algorithm using a single apparatus, thereby enabling more convenient multi-frame data processing that does not require a separate apparatus for each frame structure.

In accordance with an embodiment of the present invention, there are provided a multi-frame data processing apparatus and method using frame disassembly, which disassemble each of transmission signals having a multi-frame structure into format data and information data, process only the information data based on an algorithm using an APU, and reassemble the processed information data using the format data, thereby enabling more efficient multi-frame data processing.

In accordance with an embodiment of the present invention, there are provided a multi-frame data processing apparatus and method using frame disassembly, which convert a transmission signal having a PCM frame structure into parallel data and process the parallel data based on an algorithm, thereby enabling more rapid multi-frame data processing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-frame data processing apparatus using frame disassembly, the apparatus comprising:
   a data communicator which receives a transmission signal from a Line Adaptation Unit (LAU);
   a frame processor which disassembles each frame of the transmission signal and acquires information data that is included in the transmission signal; and
   a data processor which transfers the information data to an Algorithm Processing Unit (APU) and acquires processed information data that is obtained by processing the information data via the APU based on a corresponding algorithm, wherein the frame processor comprises:

a frame structure acquisition unit which acquires a frame structure of the transmission signal;

a frame disassembly unit which acquires format data and the information data that are included in the transmission signal in accordance with the frame structure; and a frame storage which stores the frame structure and the format data.

2. The multi-frame data processing apparatus of claim 1, wherein:

the frame processor further comprises a frame reassembly unit which reassembles the format data and the processed information data into a processed transmission signal corresponding to the frame structure; and the data communicator sends the processed transmission signal to the LAU.

3. The multi-frame data processing apparatus of claim 2, wherein the frame processor further comprises a serial/parallel data converter which converts serial data and parallel data into each other in accordance with the frame structure.

4. The multi-frame data processing apparatus of claim 3, wherein the serial/parallel data converter converts the transmission signal, that is, serial data, into parallel data and the processed information data, that is, parallel data, into serial data if the frame structure is a Pulse Code Modulation (PCM) frame structure.

5. The multi-frame data processing apparatus of claim 4, wherein the serial/parallel data converter divides the transmission signal, that is, serial data, by duration of a time slot and then converts the serial data into parallel data.

6. The multi-frame data processing apparatus of claim 4, wherein the format data comprises signaling bits if the frame structure is the PCM frame structure.

7. The multi-frame data processing apparatus of claim 4, wherein the format data comprises one or more of header information and footer information if the frame structure is an Ethernet frame structure.

8. The multi-frame data processing apparatus of claim 4, wherein the information data comprises information bits if the frame structure is the PCM frame structure.

9. The multi-frame data processing apparatus of claim 4, wherein the information data comprises payload information if the frame structure is an Ethernet frame structure.

10. A multi-frame data processing method using frame disassembly, the method comprising:

receiving a transmission signal from a Line Adaptation Unit (LAU);

disassembling each frame of the transmission signal and acquiring information data included in the transmission signal; and transferring the information data to an Algorithm Processing Unit (APU) and then acquiring processed information data that is obtained by processing the information data via the APU based on a corresponding algorithm, wherein the acquiring information data comprises:

acquiring a frame structure of the transmission signal;

acquiring format data and the information data that are included in the transmission signal in accordance with the frame structure; and storing the frame structure and the format data.

11. The multi-frame data processing method of claim 10, further comprising:

reassembling the format data and the processed information data into a processed transmission signal corresponding to the frame structure; and sending the processed transmission signal to the LAU.

12. The multi-frame data processing method of claim 11, wherein acquiring the information data further comprises converting serial data and parallel data into each other in accordance with the frame structure.

13. The multi-frame data processing method of claim 12, wherein converting serial data and parallel data to each other comprises converting the transmission signal, that is, serial data, into parallel data and the processed information data, that is, parallel data, into serial data if the frame structure is a Pulse Code Modulation (PCM) frame structure.

14. The multi-frame data processing method of claim 13, wherein converting serial data and parallel data to each other comprises dividing the transmission signal, that is, serial data, by duration of a time slot and then converting the serial data into parallel data.

15. The multi-frame data processing method of claim 13, wherein the format data comprises signaling bits if the frame structure is the PCM frame structure.

16. The multi-frame data processing method of claim 13, wherein the format data comprises one or more of header information and footer information if the frame structure is an Ethernet frame structure.

17. The multi-frame data processing method of claim 13, wherein the information data comprises information bits if the frame structure is the PCM frame structure.

18. The multi-frame data processing method of claim 13, wherein the information data comprises payload information if the frame structure is an Ethernet frame structure.

* * * * *